Feb. 15, 1927.
R. E. EATON
1,617,994
HANDY TOP FOR FISH BASKETS
Filed Oct. 20, 1925
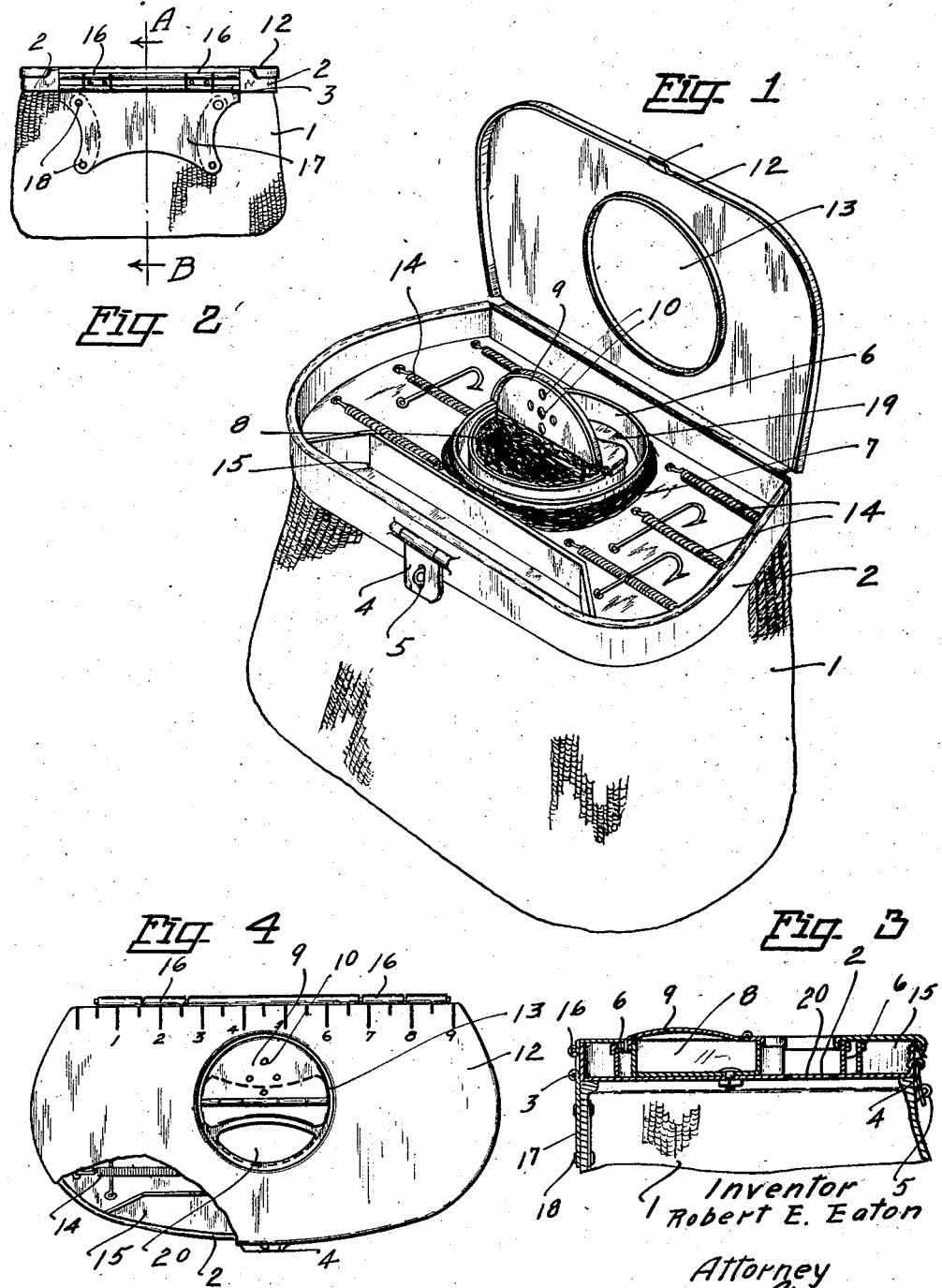
Inventor
Robert E. Eaton
Attorney Patented Feb. 15, 1927.

1,617,994

UNITED STATES PATENT OFFICE.

ROBERT E. EATON, OF LA PINE, OREGON.

HANDY TOP FOR FISH BASKETS.

Application filed October 20, 1925. Serial No. 63,662.

My invention relates to tops for use on fish baskets, and is more particularly adapted to fish baskets of the creel type, wherein a container top made of rigid material is substituted for the usual hinged lid or cover of a fish basket of the wicker or creel type. The container top is provided on its outer surface with a hinged closure, having a central opening therethrough, and a revolvable bait container disposed below the opening through the hinged closure. The fish bait container is revolvable about a fixed central journal and has a hinged closure adapted to be manipulated through the opening of the main closure for the securement of the bait through the top opening.

Further novelty resides in the attachment for hooks secured below the closure and within the container.

Further novelty resides in the graduated scale at the top of the hinged closure.

Further novelty resides in the circular band about the fish bait container adapted for the winding of fishing tackle thereabout when not in use.

Further novelty resides in a forward compartment within the enclosure for other fishing materials.

I attain these objects by the mechanism illustrated in the accompanying drawings in which—

1 is the basket creel, 2 is the container, hinged to the creel by hinging means illustrated at 3, and being secured in the usual manner to the front of the basket by a hinged locking plate 4 adapted to the passage of the locking eye 5 therethrough for locking means.

Centrally of the lid container is a circular band 6 adapted to the placing of a fish line as shown at 7 thereabout. Within the circular band is a bait box 8, having a hinged lid 9, with air spaces 10 therein. The bait box 8 is pivoted about the pin 11, and somewhat above the center of the same in such manner that as the basket is carried, the same would gravitate to the low position. The lid of the bait box may be opened through the lid closure at 12, having opening 13 therethrough.

Disposed at either end of the container 2, are spring means, as illustrated at 14 for the carrying of hooks therein. I have found that springs under tension afford suitable means for this purpose. A compartment 15 is further provided for the placing of fishing material therein. The closure 12 is hinged to the container 2 by suitable hinging means 16. To reinforce the back of the creel, and to afford suitable rigidity for the hinging of the container thereto, I have provided a back strip 17, which is secured to the creel by suitable fastenings 18.

The bait box is adapted to be rotated about the pin 11 to facilitate the taking of the bait at any desired angle, and a space 19 is provided of sufficient magnitude to permit of the placing of the hand thereabout and between the bait box and the circular band to facilitate rotation of the same.

Having thus described my invention, I wish to make the following claims therefor:

1. In a handy top for a fish basket, the combination of a container and hinging means for attaching the same to a creel, a hinged closure for said container, a circular band within the container; and a hinged box adapted to be rotated within the circular band.

2. In a handy top for a fish basket; the combination of a container; of means for hingeably fastening the container to a creel, a hinged lid for said container; there being a hole formed centrally of said lid; a circular band disposed below and concentric with said hole; a lidded bait box disposed within said band; and means to permit the rotation of the bait box about a fixed centre.

3. In a handy top for a fish basket, the combination of a container of rigid material, reinforcing hinging means for attaching the same to a creel, a hinged closure for said container there being a hole formed central of said closure; a bait box revolvable about a fixed point, disposed below said opening; a circular band about said bait box; and there being a space within the closure for the reception of fishing material.

4. In a handy top for a fish basket, the combination of a container having means therein for disposal of fishing gear; of a back strip hingeably secured to the lower edge of said container; means to secure said back strip to the rear upper edge of a fish basket; of a hinged lid for said container; there being a hole formed central of said lid; and a bait box having a hinging lid, revolvably disposed within said container and registerable with the hole in said lid.

ROBERT E. EATON.